US007817753B2

(12) United States Patent
Abe et al.

(10) Patent No.: US 7,817,753 B2
(45) Date of Patent: Oct. 19, 2010

(54) RECEPTION QUALITY ESTIMATING APPARATUS, WIRELESS COMMUNICATION SYSTEM, AND RECEPTION QUALITY ESTIMATING METHOD

(75) Inventors: Katsuaki Abe, Kanagawa (JP); Takenori Sakamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 561 days.

(21) Appl. No.: 11/915,330

(22) PCT Filed: May 23, 2006

(86) PCT No.: PCT/JP2006/310176

§ 371 (c)(1),
(2), (4) Date: Nov. 21, 2007

(87) PCT Pub. No.: WO2006/126501

PCT Pub. Date: Nov. 30, 2006

(65) Prior Publication Data

US 2009/0046771 A1 Feb. 19, 2009

(30) Foreign Application Priority Data

May 27, 2005 (JP) ............................. 2005-156082
May 19, 2006 (JP) ............................. 2006-140472

(51) Int. Cl.
*H04L 27/06* (2006.01)
*H03D 1/00* (2006.01)
(52) U.S. Cl. ...................... 375/340; 375/316; 375/324; 375/346
(58) Field of Classification Search ................. 375/340, 375/346, 316, 324
See application file for complete search history.

(56) References Cited

U.S. PATENT DOCUMENTS 5,886,999 A * 3/1999 Kojima et al. ............... 714/708

(Continued)

FOREIGN PATENT DOCUMENTS

JP 61135234 6/1986

(Continued)

OTHER PUBLICATIONS

PCT International Search Report dated Jul. 27, 2006.

(Continued)

*Primary Examiner*—Ted M Wang
(74) *Attorney, Agent, or Firm*—Dickinson Wright PLLC

(57) ABSTRACT

A reception quality estimating apparatus, a wireless communication system and a reception quality estimating method wherein the communication qualities in a case where different communication schemes are used to have communication can be artificially estimated without switching the communication schemes to be used for the communication. A wireless communication apparatus (100) comprises a reception processing part (110), an artificially decoded error estimating part (120), and an upper-order layer processing part (130). An orthogonal vector data sequence (152), which is generated by a demodulating part (111) from a received signal (150), for each symbol in the current modulation scheme is used to artificially generate a likelihood metric value (155) obtained in a case of using a second communication scheme, which has a larger number of modulation multi-values than the current communication scheme, to perform a signal point arrangement. An artificially decoding part (122) then uses the likelihood metric value (155) to perform an artificial error correction decoding process, a result of which (156) is then subjected to an error detecting process.

12 Claims, 11 Drawing Sheets

U.S. PATENT DOCUMENTS

| | | | |
|---|---|---|---|
| 6,298,073 B1 * | 10/2001 | LeFever | 370/503 |
| 7,609,610 B2 * | 10/2009 | Abe et al. | 370/204 |
| 2005/0075103 A1 | 4/2005 | Hikokubo et al. | |
| 2006/0209937 A1 | 9/2006 | Tanaka et al. | |

FOREIGN PATENT DOCUMENTS

| | | |
|---|---|---|
| JP | 2001333050 | 11/2001 |
| JP | 2002320262 | 10/2002 |
| JP | 2003338851 | 11/2003 |
| JP | 2004274103 | 9/2004 |
| JP | 2004350218 | 12/2004 |

OTHER PUBLICATIONS

Shuichi Sasaoka, "Communication Mobile," Ohmsha Ltd., May 20, 2001, pp. 103-126, with partial English translation.

* cited by examiner

| BIT ERROR DETECTED RESULT AFTER DECODING | PSEUDO RESIDUAL BIT ERROR DETECTED RESULT | DECISION CONTENT ON COMMUNICATION SCHEME CONTROL |
|---|---|---|
| PRESENCE OR ABSENCE OF RESIDUAL BIT ERROR AFTER DECODING OF MODULATION SCHEME AND CODING RATE USED FOR RECEPTION | PRESENCE OR ABSENCE OF RESIDUAL BIT ERROR AFTER DECODING WHEN M-ARY NUMBER OF MODULATION SCHEME OR CODING RATE IS INCREASED | CHANGE REQUEST CONTENT OF TRANSMISSION SPEED |
| PRESENT | — | DECREASE |
| NOT PRESENT | PRESENT | NO CHANGE |
| NOT PRESENT | NOT PRESENT | INCREASE |

FIG.10

RECEPTION QUALITY ESTIMATING APPARATUS, WIRELESS COMMUNICATION SYSTEM, AND RECEPTION QUALITY ESTIMATING METHOD

TECHNICAL FIELD

The present invention relates to a received signal quality estimating apparatus, wireless communication system and received signal quality estimating method, and relates to, for example, a communication quality estimating apparatus and communication quality estimating method suitably applicable to a wireless communication system using error correction coding and adaptive modulation control.

BACKGROUND ART

In wireless communication systems in recent years, studies on an adaptive communication scheme are underway whereby a modulation scheme and a coding scheme are adaptively switched according to communication quality of radio communication links. For example, Non-Patent Document 1 discloses a communication scheme using adaptive modulation switching, which is an example of the adaptive communication scheme. As information for deciding switching of a modulation scheme or a coding scheme, communication quality of communication links is generally measured and used.

As an index indicating communication quality, there is, for example, a method of estimating and using a bit error rate (BER) in a received bit data sequence. Patent Document 1 discloses an example of such a method whereby a transmission data sequence is subjected to error correction coding, error correction decoding upon reception and then re-encoding, and this re-encoded data sequence is compared with the received signal sequence, and the number of different parts is calculated by counting.

FIG. 11 shows the configuration of a conventional bit error rate estimating apparatus and is an example of an apparatus that measures communication quality.

In FIG. 11, bit error rate calculating apparatus 10 employs a configuration having demodulation section 11, decoding section 12, memory section 13, re-encoding section 14 and bit error rate calculating section 15. In a communication system using this conventional bit error rate calculating apparatus 10, it is assumed that transmission data is subjected to predetermined error correction coding in advance, modulated and transmitted and inputted to bit error rate calculating apparatus 10 as received signal 1. Furthermore, it is assumed that convolutional coding is used as an example of predetermined error correction coding.

Received signal 1 is demodulated according to a predetermined modulation scheme at demodulation section 11, and the demodulated result is outputted. Here, it is assumed that soft decision value 2a and hard decision value 2b are outputted per bit as the demodulated result. Soft decision value 2a for each bit is supplied to decoding section 12, error-corrected through maximum likelihood decoding such as Viterbi decoding, and decoded bit data sequence 3 is outputted. By contrast, hard decision value 2b is supplied to memory section 13 and stored temporarily. Bit data sequence 3 outputted from decoding section 12 is supplied to re-encoding section 14, subjected to convolutional coding similar to that on the transmitting side, and re-encoded data sequence 5 is outputted. Bit error rate calculating section 15 makes a comparison in bit units between hard decision data sequence 4, which is temporarily stored in and read out from memory section 13, and re-encoded data sequence 5 to judge whether or not bits in the two sequences are equal, counts unequal bits as bits containing bit errors and finally outputs calculated result 6 of the bit error rate.

Non-Patent Document 1: "Mobile Communication" written and edited by Shuichi Sasaoka (Ohmsha, Ltd. P. 103 to 126)

Patent Document 1: Japanese Patent Application Laid-Open No. SHO61-135234

DISCLOSURE OF INVENTION

Problems to be Solved by the Invention

Although the conventional bit error rate estimating apparatus as shown in FIG. 11 above can estimate a bit error rate of received bit data before decoding, so-called raw bit error rate, the apparatus cannot detect bit errors remaining after error correction decoding. In adaptive modulation control, the improvement of communication efficiency can be expected when a transmission rate is increased as much as possible within a range where bit errors after decoding can be prevented through error correction coding, by increasing an M-ary number and coding rate. However, the bit error rate estimating apparatus employing the above-described configuration cannot estimate a state of bit errors remaining after error correction decoding.

As a method for detecting bit errors remaining after error correction decoding, there is a method as already known as a general technique for detecting frame errors in HDLC (High Level Data Link Control) steps, for example, by adding an error detecting code such as the CRC (Cyclic Redundancy Check) code before error correction coding upon transmission and detecting errors using the CRC code after error correction decoding upon reception. However, when adaptive modulation control is performed based on the residual error detected result using the CRC code, the following problem further occurs. That is, there is a problem that, even if no residual bit error is detected by error detection using the CRC code, when the transmission rate is increased by increasing the M-ary number of the modulation scheme or increasing the coding rate in the state of the same communication link quality, communication quality may not be good enough to carry out communication without errors, and such a decision cannot be made appropriately. Furthermore, a similar problem occurs not only in a case where a modulation scheme is adaptively controlled, but also in a case where a coding rate upon error correction coding is adaptively changed or in a case where the multiplicity in a time-space multiplexing scheme is increased.

The present invention has been implemented in view of the above-described problems, and it is therefore an object of the present invention to provide a received signal quality estimating apparatus, wireless communication system and received signal quality estimating method that can appropriately decide whether or not communication can be carried out with an increased M-ary number or an increased coding rate, by estimating in a pseudo manner whether or not residual bit errors occur after decoding using a received signal in a current modulation scheme, coding rate or time-space multiplexing scheme, when the modulation scheme or the multiplicity of time-space multiplexing used for communication in the same communication link state is increased or the coding rate is changed.

Means for Solving the Problem

The received signal quality estimating apparatus according to the present invention employs a configuration having: a receiving section that receives a signal transmitted according to a first communication scheme; a generating section that generates a value of quality characteristics corresponding to a demodulated result obtained when a signal is transmitted according to a second communication scheme which is different from the first communication scheme based on a received and demodulated result according to the first communication scheme used for reception; and an estimating section that estimates in a pseudo manner whether or not residual bit errors occur after reception, demodulation and error correction decoding according to the second communication scheme, from the value of quality characteristics.

Furthermore, the present invention is a wireless communication system having the above-described received signal quality estimating apparatus.

The received signal quality estimating method according to the present invention includes: a reception step of receiving a signal transmitted according to a first communication scheme; a generation step of generating a value of quality characteristics corresponding to a demodulated result obtained when a signal is transmitted according to the second communication scheme different from the first communication scheme based on a received and demodulated result according to the first communication scheme used for reception; and an estimation step of estimating in a pseudo manner whether or not residual bit errors occur after reception, demodulation and error correction decoding according to the second communication scheme, from the value of quality characteristics.

Advantageous Effect of the Invention

According to the present invention, it is possible to estimate in a pseudo manner whether or not bit errors occur after error correction decoding without changing the communication scheme when using a received signal according to the first communication scheme and carrying out communication according to the second communication scheme which has a larger M-ary number, different coding rate or greater multiplicity in time-space multiplexing than the first communication scheme in a state of the same communication link. Moreover, it is possible to appropriately decide whether or not communication according to the second communication scheme is effective in a state of the current communication link based on the estimated result. As a result, the communication quality when a signal is transmitted according to the second communication scheme is estimated in a pseudo manner from the signal transmitted according to the first communication scheme, and therefore, even if the signal is not actually transmitted according to the second communication scheme, it is possible to predict communication quality according to the second communication scheme beforehand and appropriately decide whether or not communication can be carried out with an increased M-ary number or an increased coding rate.

BRIEF DESCRIPTION OF DRAWINGS

FIG. 10 shows an example of decision content of a communication scheme change based on a pseudo residual bit error detected result inputted at a communication scheme change request control section of the wireless communication apparatus according to above Embodiment 3.

BEST MODE FOR CARRYING OUT THE INVENTION

A gist of the present invention is to estimate residual bit errors after error correction decoding and the occurrence rate thereof in a pseudo manner when a signal is transmitted according to a second communication scheme having a larger M-ary number, or greater multiplicity in time-space multiplexing or a different coding rate in the same radio transmission path environment based on a signal received according to a first communication scheme. Moreover, another gist is to adaptively control a communication scheme according to the error state after error correction decoding estimated in a pseudo manner as described above.

Embodiments of the present invention will be explained below in detail with reference to the accompanying drawings.

Embodiment 1

A case will be explained in the present embodiment where residual bit errors after error correction decoding and the occurrence rate thereof are estimated in a pseudo manner when transmission is carried out using a QPSK (Quadrature Phase Shift Keying) modulation scheme as an example of a first communication scheme having a smaller M-ary number, and using 16QAM (Quadrature Amplitude Modulation) as an example of a second communication scheme having a larger M-ary number in the same transmission path. Further, it is assumed that convolutional coding having the same coding rate and generating polynomial is used for error correction coding. As an example of coding rate R, it is assumed that R=½. Furthermore, it is assumed that a CRC code is added to transmission data as a code for error detection.

Figure 1:
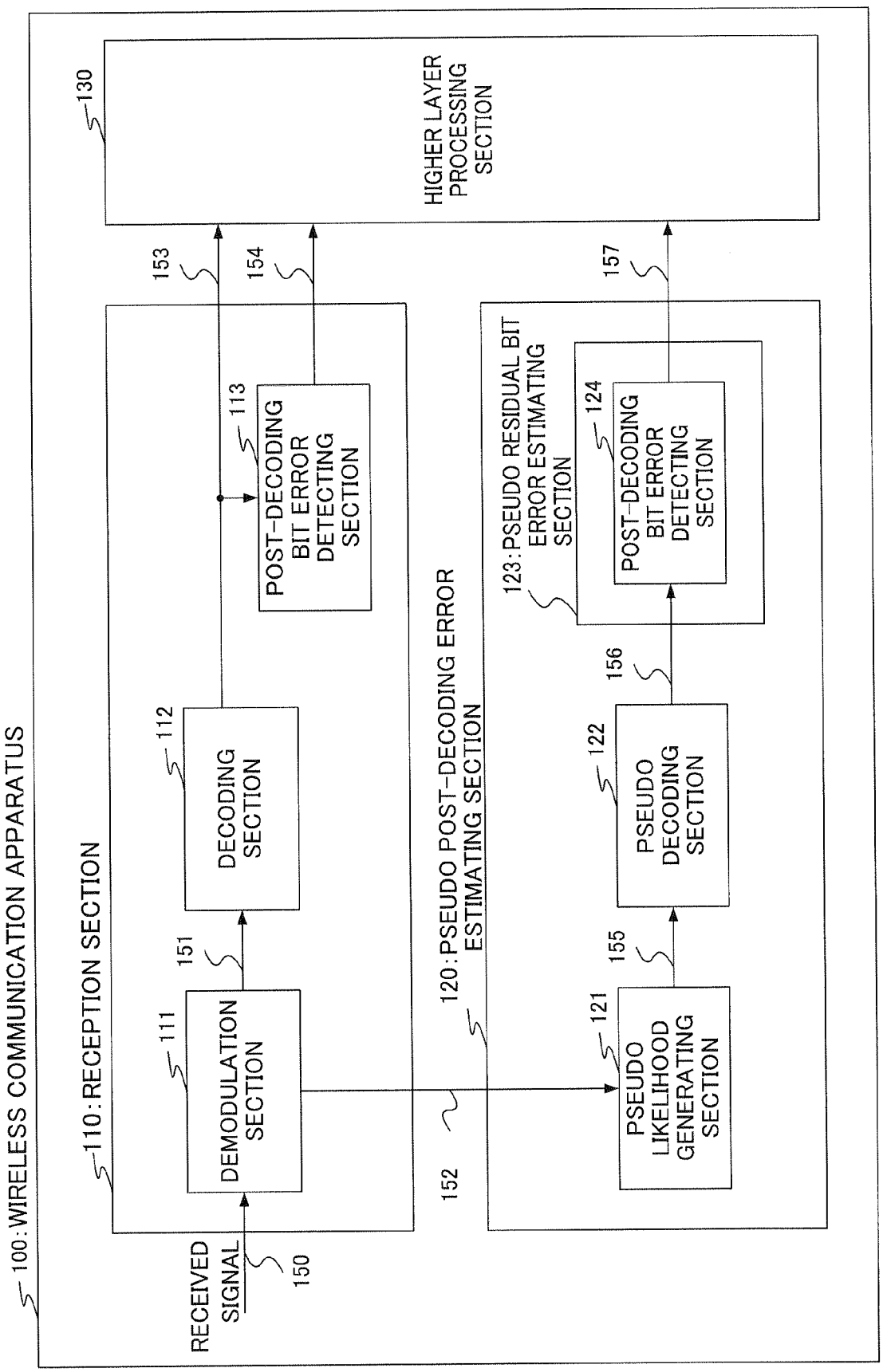
FIG. 1 is a block diagram showing a configuration of a wireless communication apparatus according to Embodiment 1 of the present invention.

FIG. 1 is a block diagram showing the configuration of a wireless communication apparatus according to Embodiment 1 of the present invention. Further, the present embodiment describes an example where the received signal quality estimating apparatus is applied to a wireless communication apparatus in a wireless communication system which adaptively controls a communication scheme.

In FIG. 1, wireless communication apparatus 100 is an apparatus for carrying out wireless communication with other wireless communication apparatuses. Out of components configuring the apparatus, those carrying out reception are selected and shown here.

Wireless communication apparatus 100 employs a configuration having reception section 110, pseudo post-decoding error estimating section 120 and higher layer processing section 130. The present embodiment is not influenced or limited by whether or not wireless communication apparatus 100 includes a transmission section.

Figure 2:
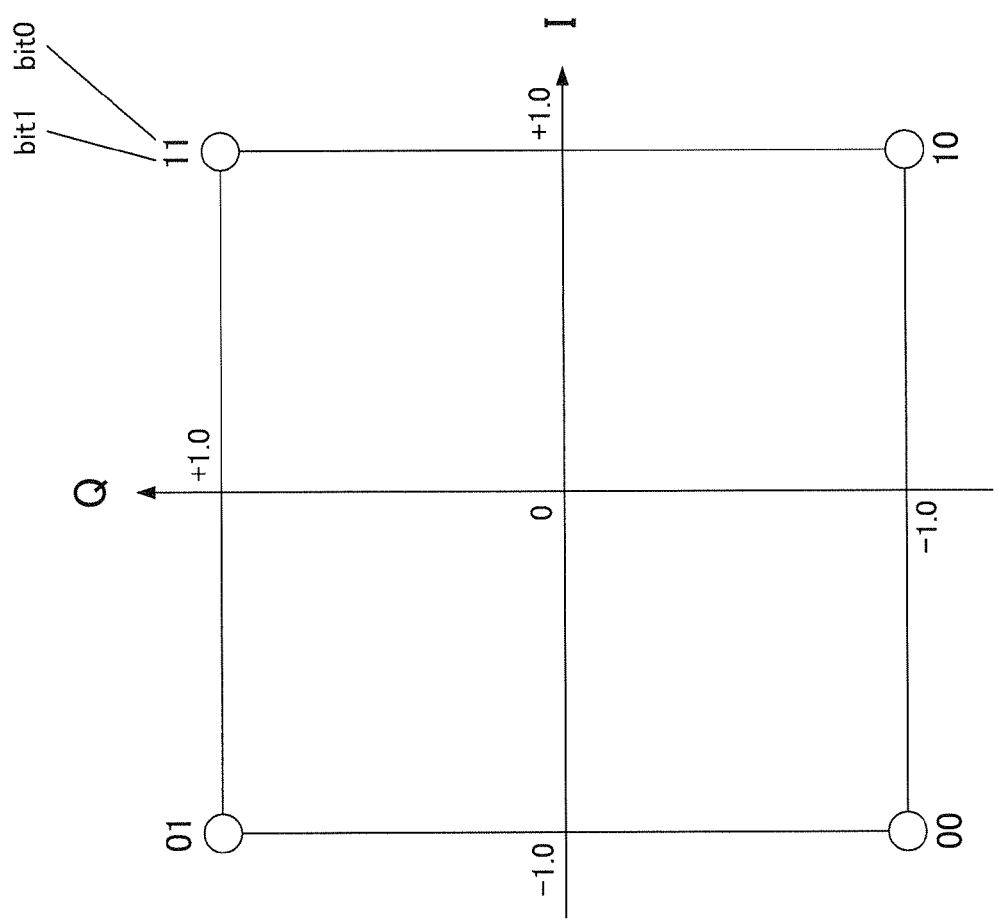
FIG. 2 shows an example of signal constellation on an IQ plane of a QPSK modulation scheme of the wireless communication apparatus according to above Embodiment 1.

Reception section 110 employs a configuration having demodulation section 111, decoding section 112 and post-decoding bit error detecting section 113, and receives a signal which is subjected to convolutional coding and QPSK modulation and received at wireless communication apparatus 100, carries out predetermined demodulation and error correction decoding and outputs the obtained received data sequence. Here, it is assumed that convolutional coding with coding rate R=½ and constraint length K=7 is used as an example of convolutional coding, and signal constellation on an orthogonal plane as shown in FIG. 2 is applied as an example of QPSK modulation. FIG. 2 shows an example of signal constellation on the IQ plane according to a QPSK modulation scheme.

Furthermore, it is assumed that received signal 150 is inputted as a digital signal in an orthogonal baseband after being subjected to predetermined frequency conversion, amplification, frequency selective filtering, orthogonal transform and analog/digital conversion in wireless communication apparatus 100.

Demodulation section 111 carries out predetermined demodulation based on a QPSK modulation scheme using the inputted orthogonal baseband signal of a digital value, outputs a soft decision result of each received bit as received soft decision value sequence 151 and further outputs orthogonal vector data 152 of each received symbol used upon demodulation. The definition of the soft decision value and orthogonal vector data to be outputted will be described later.

Using inputted received soft decision value sequence 151, decoding section 112 outputs a data sequence after decoding obtained by carrying out decoding according to a predetermined error correction coding scheme as received data sequence 153. It is assumed that the present embodiment carries out Viterbi decoding using the inputted soft decision value of each bit as a likelihood value.

Post-decoding bit error detecting section 113 receives received data sequence 153, detects whether or not bit errors remain in the above-described received data sequence and outputs the detected result. The present embodiment assumes that a CRC parity code is added to transmission data upon data transmission, and therefore post-decoding bit error detecting section 113 detects errors using the data part and part of the CRC parity code in received data sequence 151. Then, post-decoding bit error detecting section 113 detects whether or not residual bit errors have occurred in the received data sequence after error correction decoding and outputs error detected result 154.

Pseudo post-decoding error estimating section 120 employs a configuration having pseudo likelihood generating section 121, pseudo decoding section 122 and pseudo residual bit error estimating section 123. Using an orthogonal vector of the inputted received signal, pseudo post-decoding error estimating section 120 generates in a pseudo manner a likelihood value of each bit when a signal is transmitted not in the QPSK modulation scheme but in 16QAM, and carries out pseudo error correction decoding using the generated likelihood value information. Next, pseudo post-decoding error estimating section 120 estimates in a pseudo manner whether or not residual bit errors occur after error correction decoding using the decoded result obtained through the pseudo error correction decoding and outputs the estimated result.

Pseudo likelihood generating section 121 receives orthogonal vector data 152 per symbol, which is outputted from demodulation section 111 according to a QPSK modulation scheme, generates in a pseudo manner a likelihood value per bit when communication is carried out not in a QPSK modulation scheme but in 16QAM and outputs the value as pseudo likelihood value sequence 155. The method of generating the pseudo likelihood value will be described later in detail.

Pseudo decoding section 122 carries out Viterbi decoding similar to that of decoding section 112 using inputted pseudo likelihood value sequence 155 and outputs the obtained error correction decoded result as pseudo received data sequence 156, and the basic configuration and operation of pseudo decoding section 122 are the same as those of decoding section 112.

Pseudo residual bit error estimating section 123 detects whether or not bit errors remain in the data sequence using inputted pseudo received data sequence 156 and outputs pseudo residual bit error detected result 157, and can be configured with, for example, post-decoding bit error detecting section 124 in the present embodiment.

Post-decoding bit error detecting section 124 detects whether or not bit errors remain in the data sequence using inputted pseudo received data sequence 156 and outputs the detected result, and has a basic configuration and operation similar to those of post-decoding bit error detecting section 113.

Higher layer processing section 130 carries out predetermined processing in a higher layer using received data sequence 153 obtained through reception at reception section 110, post-decoding bit error detected result 154 and pseudo residual bit error detected result 157 obtained by pseudo post-decoding error estimating section 120. Although the processing in the higher layer includes various types of processing such as data transfer processing based on IP (Internet Protocol) and processing relating to transfer of content data such as moving images in an application layer, only those relating to the present invention will be described later, and the others will be omitted.

The operation of wireless communication apparatus 100 configured as described above will be described below.

First, an operation will be described where residual bit errors after error correction decoding are estimated in a pseudo manner when the received signal of the QPSK modulation scheme is used and transmitted on the same transmission path using 16QAM.

Digital orthogonal baseband signal 150 inputted at reception section 110 is supplied to demodulation section 111 and subjected to predetermined demodulation. In demodulation, the received signal is synchronized with respect to frequency and timing, and distortion of the phase and amplitude components of the received signal is compensated, as necessary. Using various conventionally known methods, these components are synchronized and compensated, an absolute phase component and amplitude component are normalized, and an orthogonal vector sequence distributed based on the positions indicated by circle marks in FIG. 3 is obtained.

Figure 3:
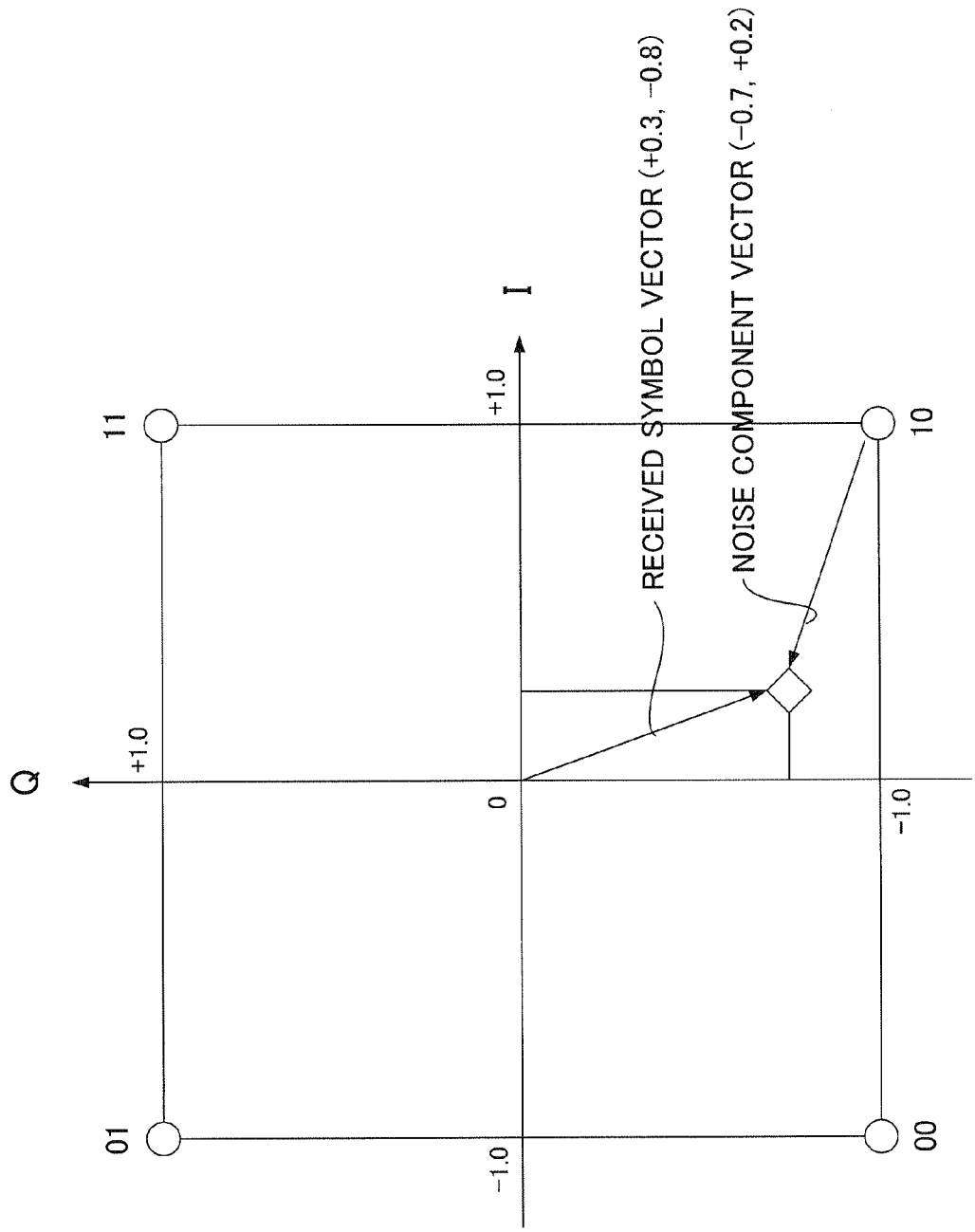
FIG. 3 shows an example of a received signal vector of a QPSK modulated signal received by the wireless communication apparatus according to above Embodiment 1.

FIG. 3 shows an example of the received signal vector on the IQ orthogonal plane of the received QPSK modulation signal. The obtained orthogonal vector per symbol after reception and demodulation is influenced by noise upon reception and has a distribution deviated from ideal signal points. Demodulation section 111 uses this obtained orthogonal vector value, generates a soft decision value of each received symbol and outputs the value as received soft decision value sequence 151. Although there are various methods of defining a soft decision value, here, a case will be explained as an example where an orthogonal vector of a given received symbol is obtained as a vector shown by a ◇ mark in FIG. 3. In this case, the received symbol is "10", and the probability is highest that a noise component vector (−0.7, +0.2) may be superimposed based on an original signal point vector (+1.0, −1.0). Of values corresponding to two bits obtained from this received symbol, the soft decision value allocated to the I-axis component is expressed as +0.3, and the soft decision value allocated to the Q-axis component is expressed as −0.8.

Decoding section 112 performs predetermined error correction decoding, using soft decision value sequence 151 supplied from demodulation section 111 as described above. The present embodiment applies convolutional coding with coding rate R=½ and constraint length K=7 as an error correction coding and performs soft decision Viterbi decoding as the maximum likelihood decoding which corresponds to the above-described encoding. In decoding, a likelihood metric value per bit is generated based on the soft decision value of each symbol of the received signal supplied from demodulation section 111. Although it has already been disclosed that various methods can be used as the method for calculating a likelihood metric value, a method of calculating a square Euclidean distance from ideal signal points and using the distance as the likelihood metric value will be explained as an example. For example, when a received symbol vector as shown with the ◇ mark in FIG. 3 is obtained, the likelihood metric value by the square Euclidean distance obtained from this vector can be calculated as follows with reference to FIG. 4.

Figure 4:
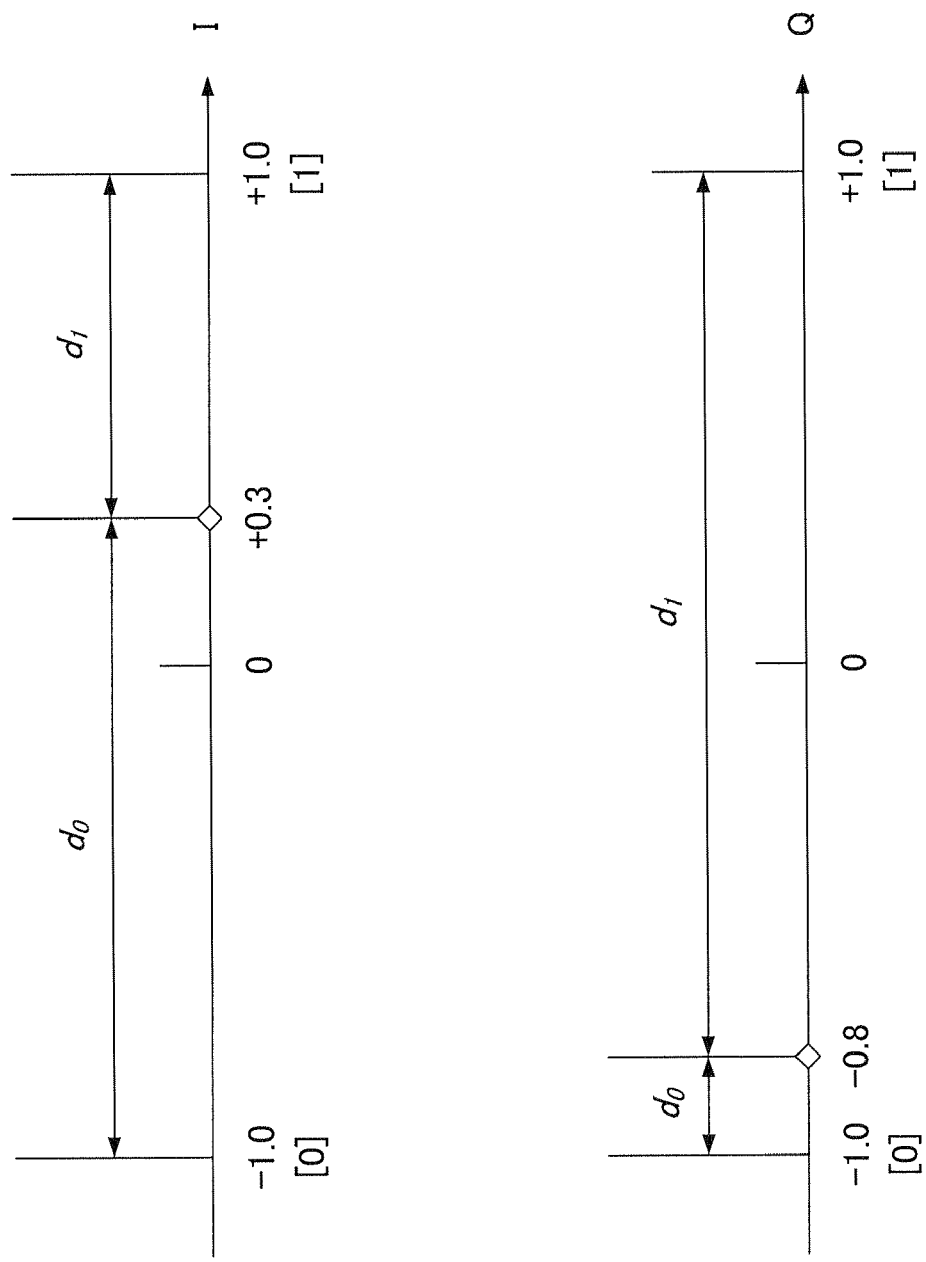
FIG. 4 shows an example where a soft decision likelihood value is calculated from a soft decision value of the wireless communication apparatus according to above Embodiment 1.

FIG. 4 shows an example where a soft decision likelihood value is calculated from a soft decision value. In FIG. 4, likelihood metric value m0 when the bit allocated in the I-axis direction is "0", and likelihood metric value m1 when the bit is "1" are calculated as shown in equation 1 and equation 2, respectively.

$$m0 = d0^{\wedge}2 = (-1.0 - 0.3)^{\wedge}2 = 1.69 \quad \text{(Equation 1)}$$

$$m1 = d1^{\wedge}2 = (+1.0 - 0.3)^{\wedge}2 = 0.49 \quad \text{(Equation 2)}$$

The above symbol ^ shows a calculation of exponentiation (square here). Furthermore, likelihood metric value m0 when the bit allocated in the Q-axis direction is "0", and likelihood metric value m1 when the bit is "1" can be calculated as shown in equation 3 and equation 4, respectively.

$$m0 = d0^{\wedge}2 = (-1.0 - (-0.8))^{\wedge}2 = 0.04 \quad \text{(Equation 3)}$$

$$m1 = d1^{\wedge}2 = (+1.0 - (-0.8))^{\wedge}2 = 3.24 \quad \text{(Equation 4)}$$

As described above, when the square Euclidian distance between the position of the received symbol and the position of an ideal signal point is used as a likelihood metric value, the likelihood metric value becomes larger in accordance with an increase in the distance between the orthogonal vector of the received symbol and the ideal signal point, and this indicates that the likelihood decreases.

By selecting a path where the cumulative metric value on a trellis diagram becomes a minimum using the likelihood metric value calculated at each symbol, a maximum likelihood decoded result can be equivalently obtained. The obtained decoded result is outputted from decoding section 112 as received data sequence 153.

It is assumed in the present embodiment that the above-described received data sequence 153 to which the transmission data part and CRC parity code corresponding to the transmission data part are added is transmitted.

Post-decoding bit error detecting section 113 detects errors based on a predetermined CRC code using inputted received data sequence 153, and detects whether or not bit errors remain in the data sequence and outputs post-decoding bit error detected result 154.

Figure 5:
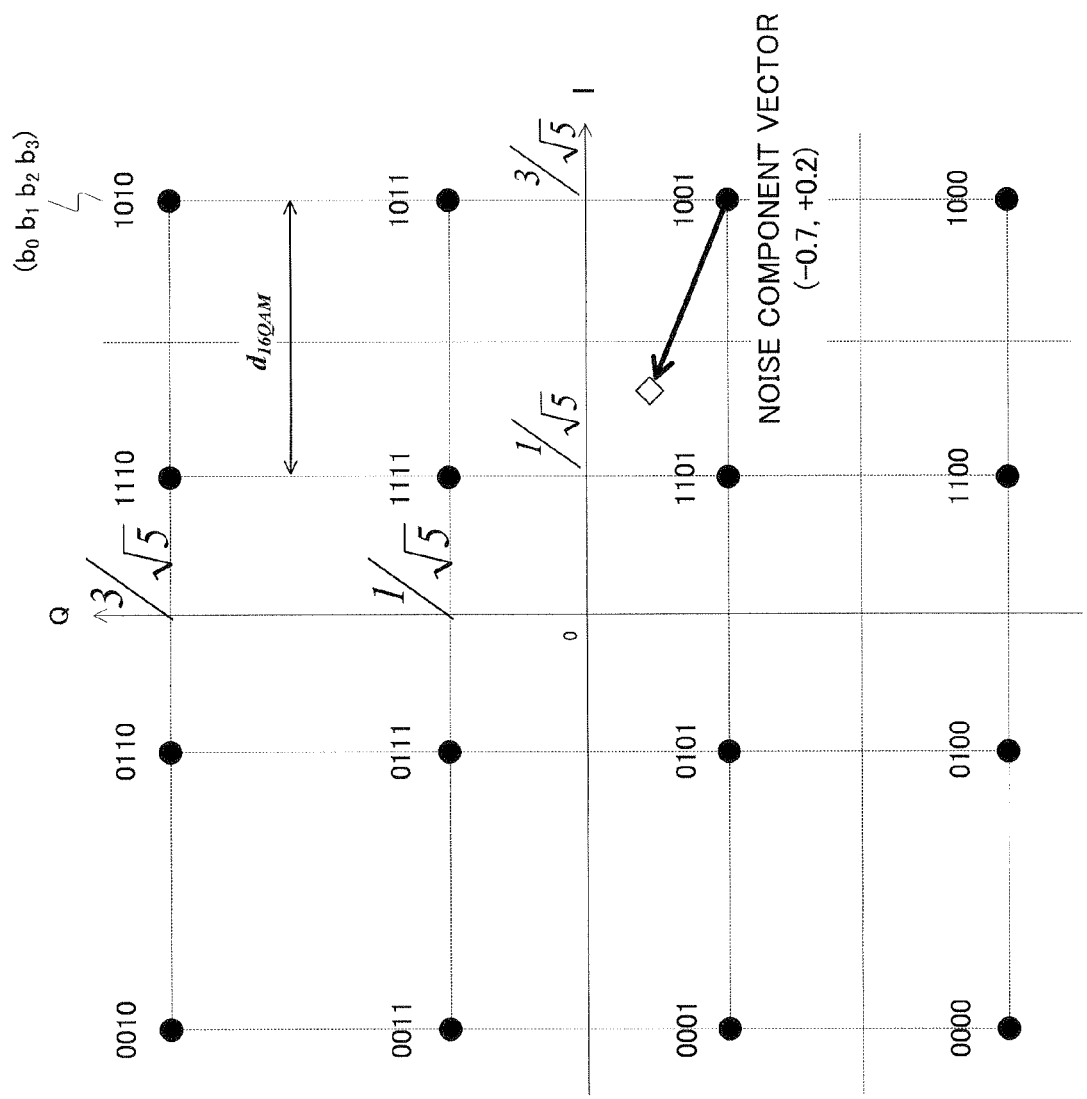
FIG. 5 shows an example of signal constellation of 16QAM assumed when the modulation scheme of the wireless communication apparatus according to above Embodiment 1 changes from QPSK to 16QAM.

FIG. 5 shows an example of estimated signal constellation of 16QAM when the modulation scheme is changed from QPSK to 16QAM. Here, it is assumed that the 16QAM modulation is performed using the same power as the QPSK modulation shown in FIG. 2.

FIG. 5 shows a case where the transmission data is (b0, b1, b2, b3)=(1, 0, 0, 1) and noise component vector is such that noise equivalent to vector (−0.7, +0.2) as shown in the above example is superimposed. That is, in the situation as shown in FIG. 3, the vector in the QPSK modulation scheme does not exceed the distance between signal points, and no received bit error occurs. However, when communication is carried out in 16QAM as shown in FIG. 5, if a similar reception noise component is superimposed, the magnitude of the noise component vector exceeds ½ of distance $d_{16QAM}$ between signal points in the case of 16QAM, and reception errors occur at some bits.

In this case, even if the noise component vector is the same, when a soft decision is made, a soft decision result which is different from the result in the case of using QPSK is obtained, and this also has an influence on the error correction performance after Viterbi decoding. The present invention takes advantage of this point and detects in a pseudo manner residual bit errors after error correction decoding in the case of using 16QAM. The processing at pseudo post-decoding error estimating section 120 will be explained below.

As described above, pseudo post-decoding error estimating section 120 generates in a pseudo manner, using the signal received in the QPSK modulation scheme, a soft decision value predicted to be obtained and a likelihood value calculated from the soft decision value when communication is carried out using 16QAM in a state where received signal quality is similar to the current received signal quality. Using this likelihood value, pseudo post-decoding error estimating section 120 then estimates in a pseudo manner whether or not errors after decoding will occur when Viterbi decoding corresponding to actual transmission of a signal in 16QAM is performed.

Figure 6:
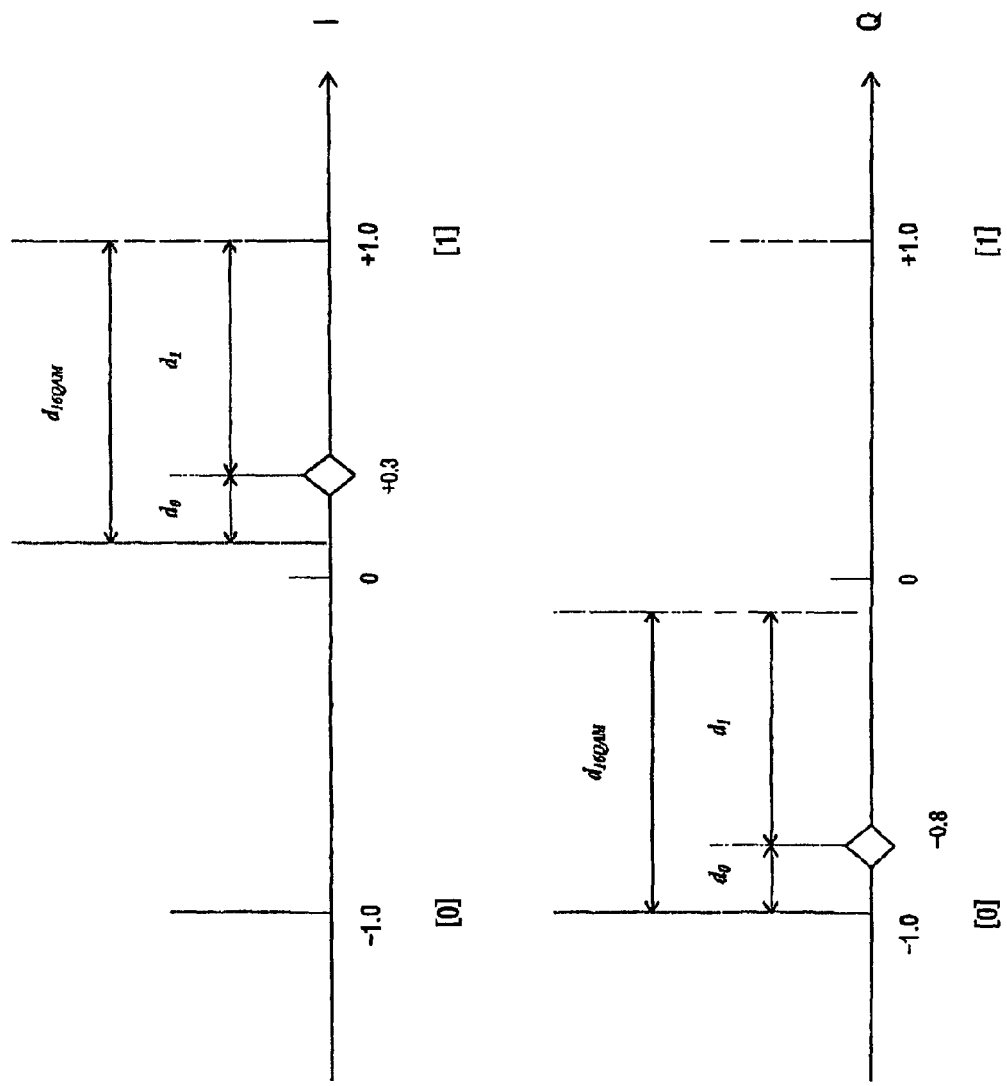
FIG. 6 shows an example where a pseudo soft decision likelihood value of the wireless communication apparatus according to above Embodiment 1 is calculated.

Using orthogonal vector data 152 which is used upon demodulation and supplied from demodulation section 111, pseudo likelihood generating section 121 generates in a pseudo manner a value equivalent to the likelihood which is obtained when a signal is transmitted in 16QAM. More specifically, when a received symbol vector (+0.3, −0.8) received in the QPSK modulation scheme as shown in FIG. 3 is obtained, likelihood values of the I component and the Q component are generated as shown in FIG. 6 using the signal point intervals of 16QAM. In other words, likelihood values of the signal received in QPSK are calculated at signal point intervals of 16QAM.

FIG. 6 shows an example of calculating a pseudo soft decision likelihood value predicted to be obtained in the 16QAM modulation scheme using the signal received in the QPSK modulation scheme. As shown in FIG. 6, received symbol "+0.3" of QPSK as the I component is positive, and therefore a square Euclidean distance is calculated for $d_1$ based on the distance from "+1.0" corresponding to the signal point of [1] of QPSK. As for do, the modulation scheme is changed to 16QAM in a pseudo manner, and a square Euclidean distance from the position which is away from "+1.0" by $d_{16QAM}$ is calculated. As for the Q component, received symbol "−0.8" of QPSK is negative, and a square Euclidean distance is calculated for do based on the distance from "−1.0" corresponding to the signal point of [0] of QPSK, while the modulation scheme is replaced by 16QAM in a pseudo manner for $d_1$, and a square Euclidean distance of the signal point that is away from point "−1.0" by $d_{16QAM}$ is calculated.

In this way, a likelihood value which is different from the one obtained based on the signal constellation of the original QPSK modulation as shown in FIG. 4 is obtained. Especially, in this example, as for the likelihood value on the I-component side, the likelihood value of the data of "0" is smaller than the likelihood value of the data of "1", that is, higher likelihood is obtained for the data of "0". This reproduces in a pseudo manner a case where, when transmission is actually carried out in 16QAM instead of QPSK in a similar radio transmission path environment, bit errors occur in the received and demodulated result, and the relationship in likelihood is inverted. In other words, when a modulation scheme is switched, the likelihood can be estimated more accurately if there is less fluctuation in the radio transmission path environment.

As described above, pseudo decoding section 122 performs Viterbi decoding similar to that carried out by decoding section 112 using the likelihood value generated by pseudo likelihood generating section 121. Here, as for the likelihood metric value supplied to Viterbi decoding, the difference between m0 and m1 is relatively smaller than the likelihood metric value obtained from the original demodulated result in QPSK, that is, a sequence with a small difference in likelihood is supplied, and there will be a case where pseudo decoding section 122 cannot correct errors while decoding section 112 can correct errors. Pseudo residual bit error estimating section 123 detects whether or not there are residual bit errors after decoding through CRC error detection and outputs pseudo residual bit error detected result 157.

As described above, Embodiment 1 uses orthogonal vector data 152 according to the current modulation scheme for each symbol obtained from received signal 150 by demodulation section 111, generates in a pseudo manner likelihood metric value 155 obtained when signal points are arranged according to a second modulation scheme having a larger M-ary number than the current one, performs error correction decoding in a pseudo manner through pseudo decoding section 122 using likelihood metric value 155 and detects errors of obtained pseudo decoded result 156. In this way, when communication is performed in the second modulation scheme, pseudo post-decoding error estimating section 120 detects in a pseudo manner whether or not residual bit errors occur after error correction decoding, so that it is possible to estimate in a pseudo manner communication quality from the signal transmitted in the first communication scheme when the signal is transmitted in the second communication scheme, and predict communication quality in the communication scheme beforehand without actually transmitting the signal in the second communication scheme. Furthermore, it is possible to estimate in a pseudo manner whether or not residual bit errors occur after decoding by generating in a pseudo manner a likelihood value predicted to be obtained when communication is carried out in the second communication scheme, and performing error correction decoding using the generated likelihood value.

Especially, while the present embodiment performs normal error correction decoding using a likelihood value obtained from a received QPSK modulation signal and obtains a received data sequence, the present embodiment also generates in a pseudo manner a likelihood metric value predicted to be obtained when a signal is modulated and transmitted in 16QAM in a similar radio transmission path environment, performs error correction decoding in a pseudo manner using the obtained pseudo likelihood value sequence and detects whether or not there are errors in the obtained pseudo received data. By doing so, it is possible to detect in a pseudo manner errors after error correction decoding predicted to occur when communication is carried out in 16QAM having a larger M-ary number than the QPSK modulation scheme.

In order to explain an example of detecting in a pseudo manner errors after error correction decoding, which may occur when communication is carried out in a second modulation scheme having a larger M-ary number than a first modulation scheme in the same transmission path environment, using a received signal in the first modulation scheme having a relatively small M-ary number, it is assumed in the present embodiment that a QPSK modulation scheme is an example of the first modulation scheme and 16QAM is an example of the second modulation scheme. However, the present invention is not limited to this and is also applicable to a case where arbitrary modulation schemes are used, if the M-ary number of the second modulation scheme is larger than the M-ary number of the first modulation scheme, and it is possible to employ a configuration such that a likelihood value is generated in a pseudo manner based on the difference in the Euclidean distance between signal points on the IQ plane in the modulation schemes when a signal is received in the second modulation scheme.

Furthermore, although the explanation of the present embodiment includes no descriptions of components of wireless communication apparatus 100 in FIG. 1 such as an antenna and a radio high-frequency signal section that have no particular implications in the explanations of the present embodiment, it goes without saying that the present invention is not influenced by being provided with these components to configure an apparatus for general wireless communication. Similarly, although a case has been explained with the present embodiment where an input signal for demodulation section 111 is an orthogonal baseband signal converted to a digital value, the present invention is not particularly limited to the interface of demodulation section 111. For example, it is also possible to employ a configuration where a signal in an intermediate frequency (IF) band instead of an orthogonal baseband signal is inputted and demodulation section 111 applies quadrature demodulation thereto or an analog signal is inputted and demodulation section 111 converts the inputted signal to a digital value. Furthermore, although a case has been described with the present embodiment where soft decision value sequence 151 is supplied from the demodulation section to the decoding section and decoding section 112 generates a likelihood value using soft decision value sequence 151, it is possible to employ a configuration where demodulation section 111 obtains a soft decision value, generates a likelihood value and supplies the generated likelihood value to decoding section 112, and decoding section 112 performs Viterbi decoding using the supplied likelihood value.

Furthermore, the present embodiment has explained the configuration and operation for generating by two bits per symbol, likelihood values predicted to be obtained when communication is carried out in 16QAM, using a received signal in a QPSK modulation scheme. However, when the signal is actually transmitted in 16QAM, likelihood information corresponding to four bits per symbol is obtained. Even if pseudo likelihood generating section 121 performs such processing to generate likelihood information for four bits per symbol to reduce the above difference, the gist of the present invention would not change. More specifically, it is possible to adopt a configuration where pseudo post-decoding error estimating section 120 in the configuration shown in FIG. 1 provides a pseudo post-coding sequence generating section that generates in a pseudo manner a convolutional coding sequence corresponding to the number of bits of a data sequence predicted when communication is carried out in 16QAM, pseudo likelihood generation section 121 duplicates likelihood values generated by two bits per symbol to generate pseudo likelihood values corresponding to four bits or more, the pseudo likelihood values are randomly allocated to the positions corresponding to "0" or "1" of a codeword generated by the pseudo post-coding sequence generating section and supplied to pseudo decoding section 122 to perform pseudo decoding. Likewise, of the four bit data (b0, b1, b2, b3 in FIG. 5) transmitted within one symbol in 16QAM, the distance between signal points of different bit data changes according to content of given bit data, and, in detail, likelihood values vary per bit data. To reduce such a difference, even if a configuration is employed to adopt a plurality of methods of generating likelihood using the decided result of bit data on one side (Q-component side in this case) when a pseudo likelihood value of bit data on the other side (for example, the I-component side) is generated, the gist of the present invention will not change.

Calculation of likelihood does not always need to be performed per bit, and the present invention can be also applicable when calculation is performed per symbol. In this case, the likelihood can be calculated by changing the configuration and operation of pseudo likelihood generating section 121 so as to generate the Euclidean distance from signal points as a soft decision value.

Furthermore, although a case has been described in the present embodiment where convolutional coding is used as an example of error correction coding to be used, the present invention is not limited to this, and other coding may also be used if decoding using likelihood metric values is performed upon error correction decoding. For example, the present invention is also applicable when so-called "punctured convolutional codes" or "turbo codes" are used where transmission is carried out by deleting codewords at predetermined positions after error correction coding and influences of these deleted codewords are compensated by error correction decoding on the receiving side. Furthermore, for a system where block codes such as low-density parity check codes and Reed-Solomon codes are used, the present invention is also applicable, when decoding is performed based on a likelihood value, by generating pseudo likelihood values as in the present embodiment and providing a processing section that performs pseudo block decoding using the generated value.

Furthermore, although a method has been described in the present embodiment where residual bit errors after error correction decoding are detected in a pseudo manner using CRC codes, the method of detecting residual bit errors after error correction decoding is not limited to the above-described method, and other methods may also be used.

For example, decoding section 112 of reception section 110 carries out error correction decoding to generate an original received data sequence from a received signal in a QPSK modulation scheme, so that it is possible to estimate in a pseudo manner whether or not errors after decoding occur when a signal is transmitted in 16QAM by employing a configuration where the obtained received data sequence through this decoding is supplied to pseudo residual bit error estimating section 123, comparing the received data between received data sequence 153 and data sequence 155 of the pseudo decoded result and detecting different parts.

Using this technique eliminates the necessity for adding CRC codes to the transmission data, so that it is possible to use the transmission data capacity more efficiently.

Furthermore, it is also possible to estimate from statistics whether or not residual bit errors can occur using a cumulative metric value obtained through pseudo decoding instead of detecting errors with CRC. More specifically, the apparatus may be configured so that the cumulative metric value obtained through the pseudo decoding and the probability of occurrence of residual bit errors at that time are statistically calculated beforehand and the probability of occurrence of residual bit errors is estimated based on the obtained statistical data.

Moreover, even if a configuration and operation are adopted of calculating other parameters representing quality of the data after error correction instead of detecting in a pseudo manner whether or not there are errors, the gist of the present invention will not change. For example, it is also possible to employ a configuration of calculating and outputting a residual bit error rate by calculating a ratio of the number of the occurred residual bit errors to the evaluated total number. Furthermore, it is also possible to employ a configuration of calculating a frame error rate based on a pseudo error detected result.

Furthermore, pseudo post-decoding error estimating section 120 does not always need to perform estimation operation, and can also employ a configuration of performing pseudo estimation only when there is no error in the result of the error correction performed by reception section 110. This is because in an environment where residual errors occur even after error correction in communication in the QPSK modulation scheme, it is predictable that there is an extremely high possibility of occurrence of residual bit errors after the error correction even if communication is carried out in 16QAM. In order to perform the above-described control operation, when residual bit errors after decoding have been detected as a result of error detection using CRC codes carried out at higher layer processing section 130 using received data sequence 153, it is possible to employ a configuration of controlling pseudo post-decoding error estimating section 120 so as to stop the pseudo estimation operation.

Furthermore, decoding section 112 in reception section 110 and pseudo decoding section 122 in pseudo post-decoding error estimating section 120 have basically the same configuration and operation, and therefore these sections may be configured so as to share their operating components and carry out the operations at different times. In this case, it is also possible to employ a configuration of providing a storage section for buffering an inputted likelihood value sequence before the decoding section.

Furthermore, post-decoding bit error detecting section 113 and post-decoding bit error detecting section 124 also have basically the same configuration and operation, and these sections may be configured so as to share their operating components and carry out the operations at different times. In this case, it is also possible to employ a configuration of providing a storage section for buffering an inputted data sequence before the post-decoding bit error detecting section. Furthermore, when the wireless communication apparatus is provided with a processor such as CPU and DSP that can be operated by software, it goes without saying that this embodiment can be implemented by mounting the processing sections explained in the present embodiment as software.

Furthermore, although a configuration has been described with in present embodiment where residual bit errors after error correction decoding are estimated in a pseudo manner when a modulation scheme changes to another modulation scheme having a larger M-ary number than the modulation scheme of the signal currently being received, a target to be changed is not limited to the modulation scheme, and other items may be changed. For example, the present invention is also applicable when data is radio transmitted by time-space multiplexing, and, in this case, when the multiplicity is increased greater than the multiplicity of the time-space multiplexing scheme used for current reception, the present invention is also applicable to a case of estimating in a pseudo manner whether or not residual bit errors will occur after error correction decoding. In this case, pseudo likelihood generating section 121 may be configured so as to generate a soft decision likelihood value estimated when the multiplicity in time-space multiplexing is increased based on, for example, the characteristic of radio transmission paths obtained using the received signal.

Embodiment 2

A case will be described with Embodiment 2 where residual bit errors after error correction decoding and the occurrence rate thereof are estimated in a pseudo manner based on a signal being received in a first communication scheme having a lower coding rate when transmission is carried out in a second communication scheme having a different coding rate through the same radio transmission path.

More specifically, a case will be described in the present embodiment where punctured convolutional coding is used as error correction coding for both a first communication scheme and a second communication scheme, coded bit data is generated with R1=$^2/_3$, that is, three codeword bits per two information bits as a coding rate R1 in the first communication scheme, and coded bit data is generated with R2=$^3/_4$, that is, four codeword bits per three information bits as a coding rate R2 in the second communication scheme.

More specifically, it is assumed that the coding rate in convolutional coding is ½ and the puncturing rate of puncturing applied after the convolutional coding is ¾ for the first communication scheme, that is, one codeword at a predetermined position is deleted per four codewords, and the puncturing rate is $^4/_6$ for the second communication scheme, that is, two codewords at predetermined positions are deleted per six codewords, and the above-described coding rates are obtained. Here, for ease of explanation, a case is assumed where the QPSK modulation scheme is used in both the first communication scheme and the second communication scheme.

Figure 7:
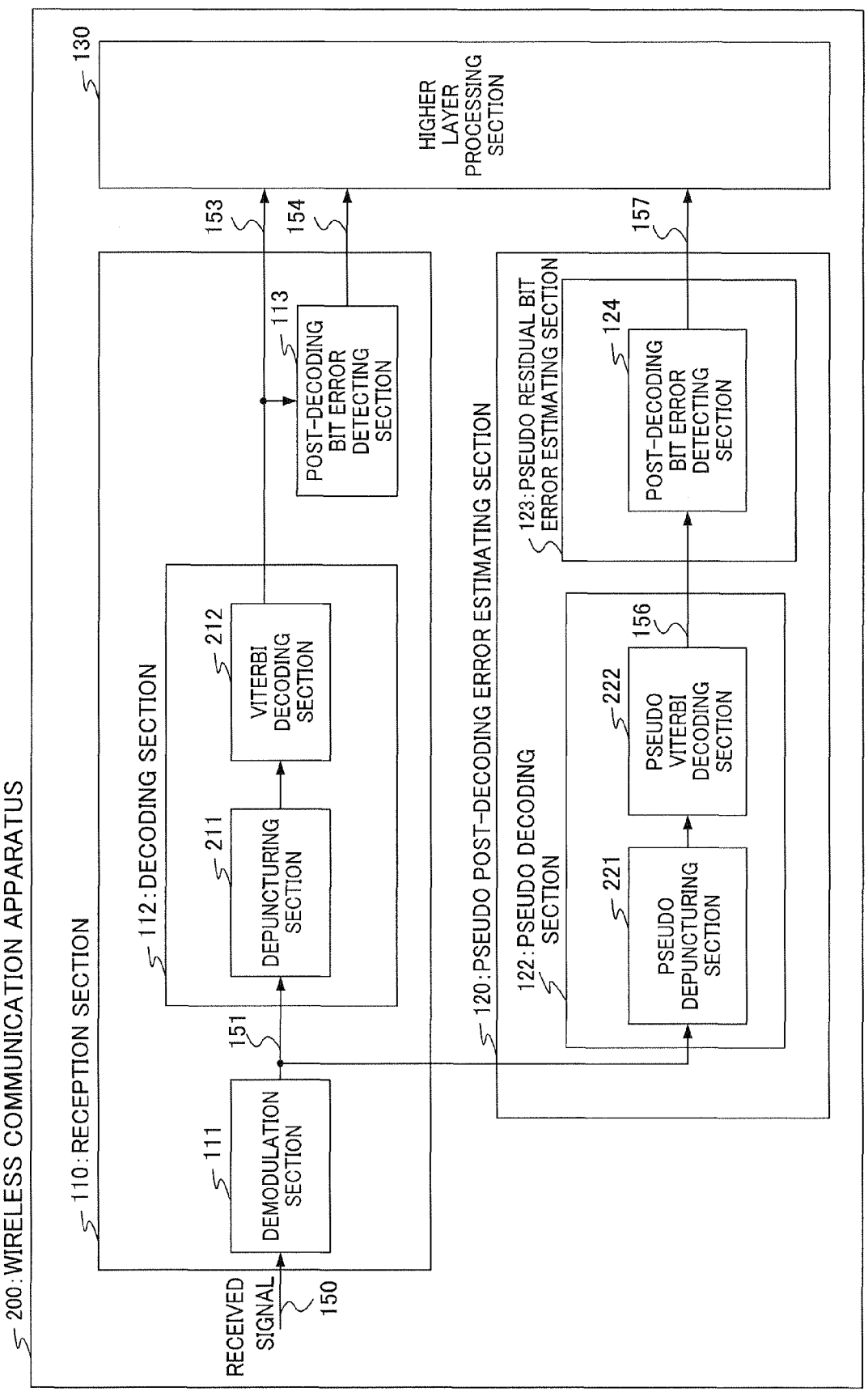
FIG. 7 is a block diagram showing a configuration of a wireless communication apparatus according to Embodiment 2 of the present invention.

FIG. 7 is a block diagram showing the configuration of the wireless communication apparatus according to Embodiment 2 of the present invention. In the explanation of the present embodiment, components having the same configuration and operation as those of the components in FIG. 1 are assigned the same reference numerals.

The configuration in FIG. 7 differs from the configuration in FIG. 1 in that wireless communication apparatus 200 is configured so that decoding section 112 of reception section 110 is provided with depuncturing section 211 and Viterbi decoding section 212, pseudo decoding section 122 of pseudo post-decoding error estimating section 120 is provided with pseudo depuncturing section 221 and pseudo Viterbi decoding section 222, and reception soft decision value sequence 151 which is a soft decision result of a received modulated symbol outputted from demodulation section 111 is supplied and inputted to pseudo decoding section 122.

Depuncturing section 211 performs processing of restoring parts of inputted received soft decision value sequence 151, where data has been deleted through puncturing on the transmitting side. More specifically, depuncturing section 211 performs this processing by inserting a dummy soft decision value (which corresponds to 0.0 in the case of the signal constellation shown in FIG. 2) where the likelihood metric value having the received bit data of "0" is equal to the likelihood metric value having the received bit data of "1", in parts where data has been deleted through the puncturing, and outputting the obtained soft decision value sequence. The depuncturing rate in the first communication scheme is ¾ in the present embodiment, and a dummy soft decision value is inserted to a predetermined position for three inputs of soft decision values.

Viterbi decoding section 212 performs predetermined Viterbi decoding using the inputted depunctured soft decision value sequence, and, for example, is realized by the operation similar to that explained as an example of the operation of decoding section 112 in Embodiment 1.

On the other hand, pseudo depuncturing section 221 performs basically the same operation as that of depuncturing section 211, but has a different depuncturing rate of $^4/_6$. That is, dummy soft decision values are inserted into two predetermined positions for inputs of four soft decision values.

Pseudo Viterbi decoding section 222 performs basically the same operation as that of Viterbi decoding section 212, but differs in that pseudo Viterbi decoding section 222 performs Viterbi decoding using a pseudo soft decision value sequence supplied from pseudo depuncturing section 221.

A case will be described in the present embodiment where 120-bit information bit data in the first communication scheme is converted to 180-bit coded bit data through punctured convolutional coding, and modulated in QPSK as an example. Here, for ease of explanation, the present embodiment will be explained ignoring processing of inserting a termination bit in convolutional coding.

Hereinafter, the operation of wireless communication apparatus 200 configured as described above will be explained.

A method of estimating in a pseudo manner whether or not bit errors after decoding occur when reception, demodulation and decoding are performed and transmission is carried out in the second communication scheme having a different coding rate in the same transmission path environment, will be explained especially focusing on parts different from those in Embodiment 1.

Reception section 110 performs predetermined demodulation for QPSK modulation using received signal 150 which is an inputted orthogonal baseband signal. Reception section 110 then supplies soft decision value sequence 151 obtained in the same way as Embodiment 1 to decoding section 112. In decoding section 112, depuncturing section 211 performs depuncturing first by inserting a dummy soft decision value into a predetermined position per three soft decision value inputs. In this way, the soft decision value sequence after the depuncturing corresponds to 240 bits. Viterbi decoding section 212 performs predetermined Viterbi decoding using the obtained soft decision value sequence, outputs decoded bit data after error correction corresponding to 120 bits, and after that, whether or not there are bit errors after decoding using CRC codes is detected as in the case of Embodiment 1 described above.

On the other hand, in pseudo depuncturing section 221, pseudo post-decoding error estimating section 120 performs depuncturing corresponding to the processing at a puncturing rate of 4/6 by using the inputted soft decision value sequence and inserting dummy soft decision values at two predetermined positions every time four soft decision values are inputted. In this way, a depunctured soft decision sequence corresponding to 270 bits is generated from the soft decision value sequence corresponding to 180 bits, and the soft decision value sequence corresponding to 240 bits out of 270 bits is supplied to pseudo Viterbi decoding section 222. Pseudo Viterbi section 222 performs Viterbi decoding using the inputted soft decision value sequence and outputs the decoded result as pseudo received data sequence 156.

Here, the obtained pseudo received data sequence represents data after error correction decoding obtained by producing in a pseudo manner a situation where the coding rate is higher than that of the punctured convolutional coding carried out in communication according to a first communication scheme, that is, a situation where more convolutional coded bit data is punctured. Post-decoding bit error detecting section 124 detects CRC errors of pseudo received bit data sequence 156, and detects in a pseudo manner whether or not bit errors after decoding occur when transmission is carried out at coding rate R=3/4.

As described above, according to Embodiment 2, it is possible to detect in a pseudo manner whether or not residual bit errors occur after error correction decoding when transmission is carried out in the same transmission path environment using error correction coding with a different coding rate, for example, coding rate R=3/4, by using a soft decision value obtained from a received and demodulated result of a signal subjected to punctured convolutional coding with coding rate R=2/3 and QPSK modulation.

A case has been described in the present embodiment where the pseudo post-decoding error estimating section uses a received signal according to a first communication scheme and detects in a pseudo manner whether or not residual bit errors occur after error correction decoding when communication is performed according to a second communication scheme having a coding rate different from that of the first communication scheme in the same transmission path environment, but the applicable range of the present invention is not limited to this configuration and operation.

For example, although a case has been described in the present embodiment where the same modulation scheme is used for the first communication scheme and the second communication scheme, the present invention is not necessarily limited to this, and the present invention is also applicable to pseudo estimation when the M-ary number of the modulation scheme in the second communication scheme is larger than the M-ary number of the modulation scheme in the first communication scheme as in the case of Embodiment 1. For example, the present embodiment is also applicable to a case where residual bit errors after error correction decoding are detected in a pseudo manner when communication is carried out with a modulation scheme of 16QAM as the second communication scheme and at coding rate R=1/2, while communication is being carried out in a modulation scheme of QPSK as the first communication scheme and at coding rate R=2/3.

Figure 8:
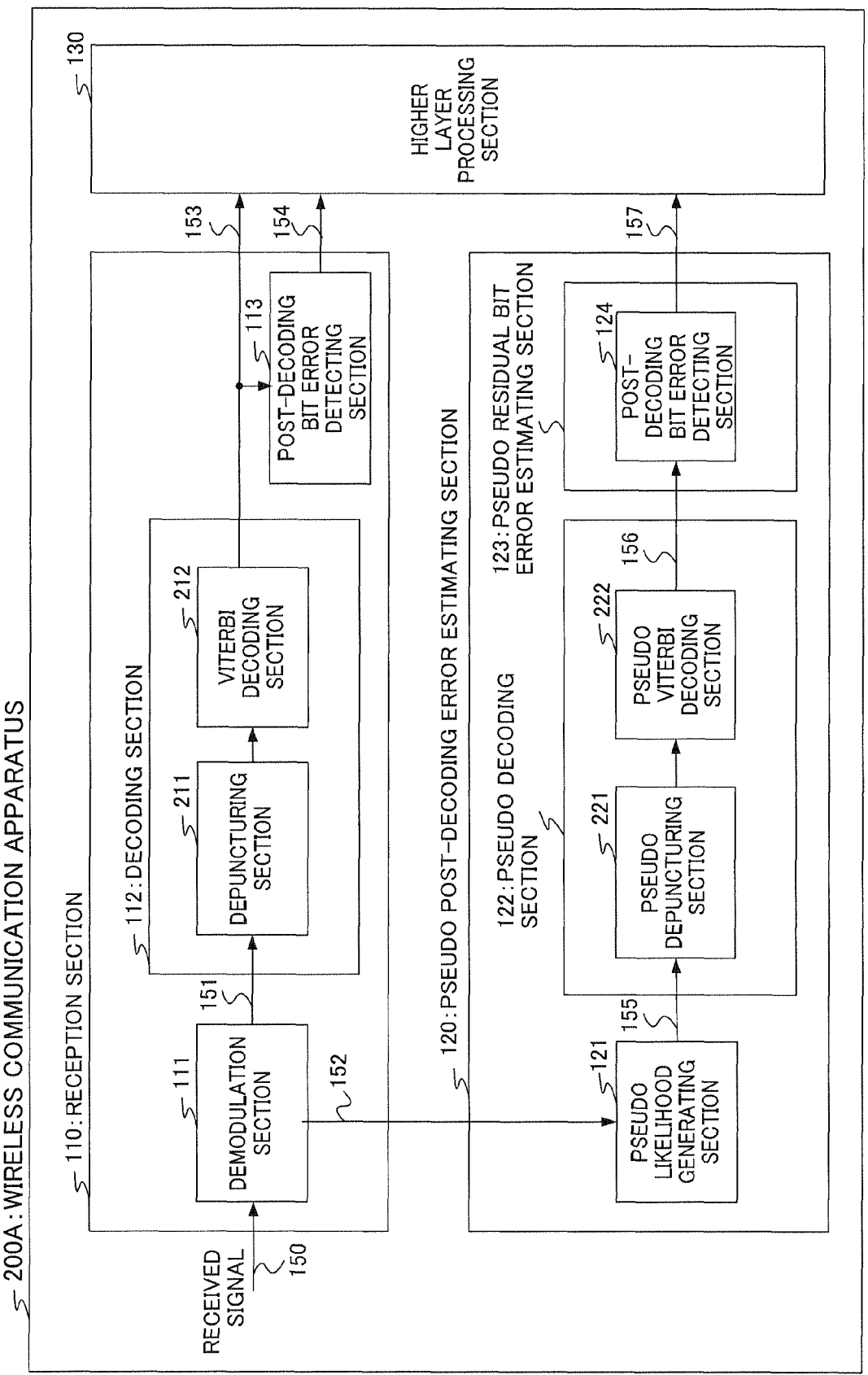
FIG. 8 shows another configuration example of the wireless communication apparatus according to above Embodiment 2.

FIG. 8 shows another example of the configuration of the wireless communication apparatus according to Embodiment 2. As shown in FIG. 8, wireless communication apparatus 200A is provided with pseudo likelihood generating section 121 used in FIG. 1 before pseudo decoding section 122, and may perform pseudo decoding as explained in the present embodiment by generating in a pseudo manner a soft decision value predicted to be obtained when a signal is transmitted in 16QAM.

Furthermore, the processing at decoding section 112 and pseudo decoding section 122 are not limited to the above-described explanations and can also be implemented using other methods. For example, instead of performing depuncturing explained above, it is also possible to employ a configuration where Viterbi decoding section 212 does not use likelihood values inputted at predetermined puncturing positions and equivalently performs depuncturing. Furthermore, although the present embodiment does not explicitly describe CODEC processing other than puncturing and convolutional coding, even if a configuration of performing processing such as interleaving and scrambling is employed as necessary, predetermined receiving-side processing section may be provided for decoding section 112 and pseudo decoding section 122 accordingly, and such a configuration has no influence on the present invention.

Furthermore, although a case has been described in the present embodiment where the present embodiment is applied to a system using convolutional coding and puncturing, the present invention is not limited to this and is also applicable to a system using block codes such as low-density parity check codes or Reed-Solomon codes and puncturing. Moreover, a system which changes a coding rate by changing a generating polynomial of block codes instead of changing the puncturing rate can also be assumed depending on the system using these block codes. By also assuming puncturing whereby the coding rates equivalently become equal and performing pseudo residual error detection for such a system, it is also possible to estimate in a pseudo manner whether or not residual bit errors can occur.

Embodiment 3

A case has been described where it is possible to estimate in a pseudo manner whether or not errors after decoding can occur after error correction decoding when communication is carried out in the same transmission path environment according to a modulation scheme or coding rate different from the current one, using the configuration and operation according to aforementioned Embodiments 1 and 2. Based on the pseudo-error detected result obtained in this way, the configuration and operation will be described where control is performed so as to appropriately change the modulation scheme or coding rate used for communication.

Figure 9:
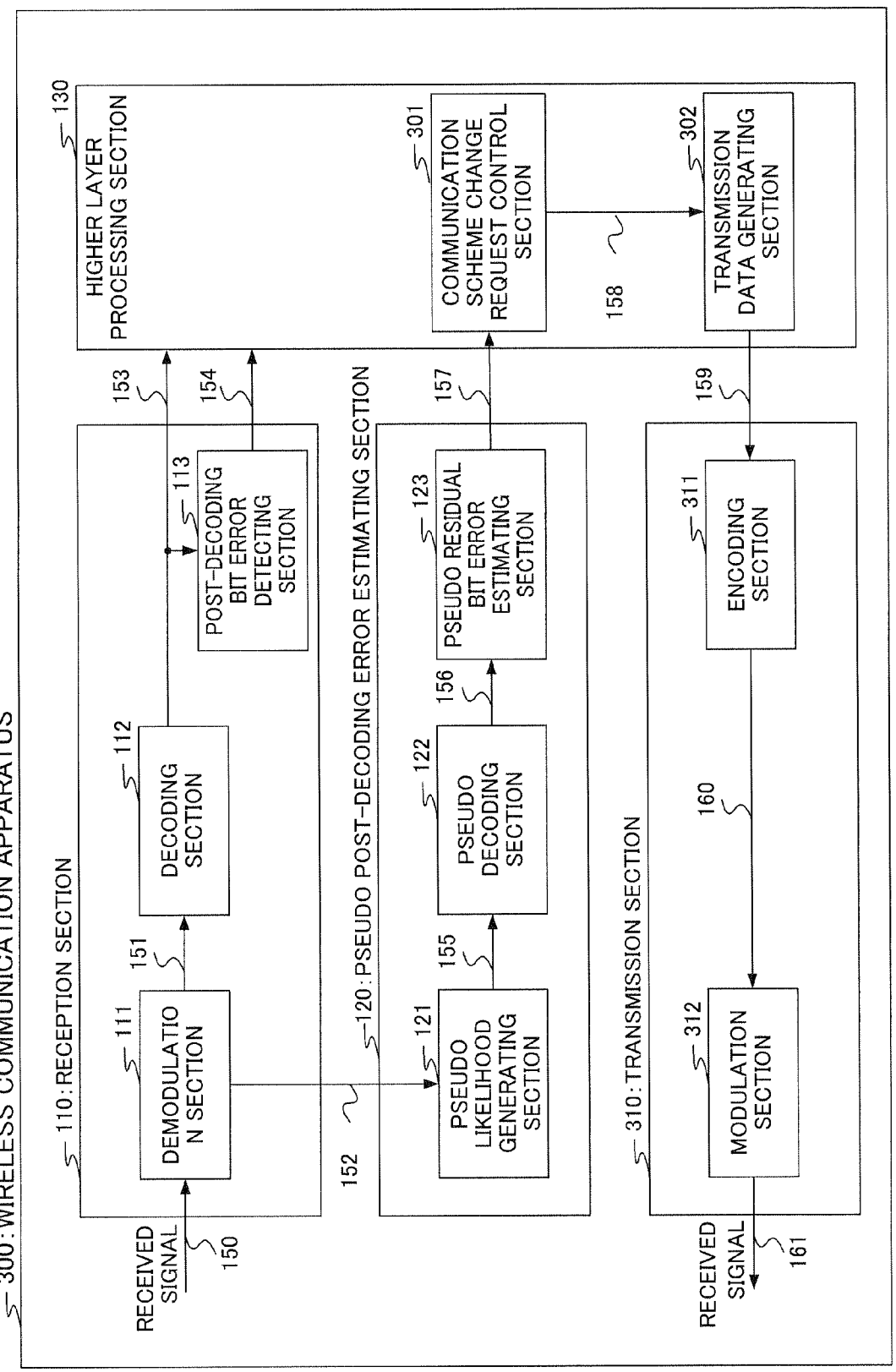
FIG. 9 is a block diagram showing a configuration of a wireless communication apparatus according to Embodiment 3 of the present invention.
Figure 11:
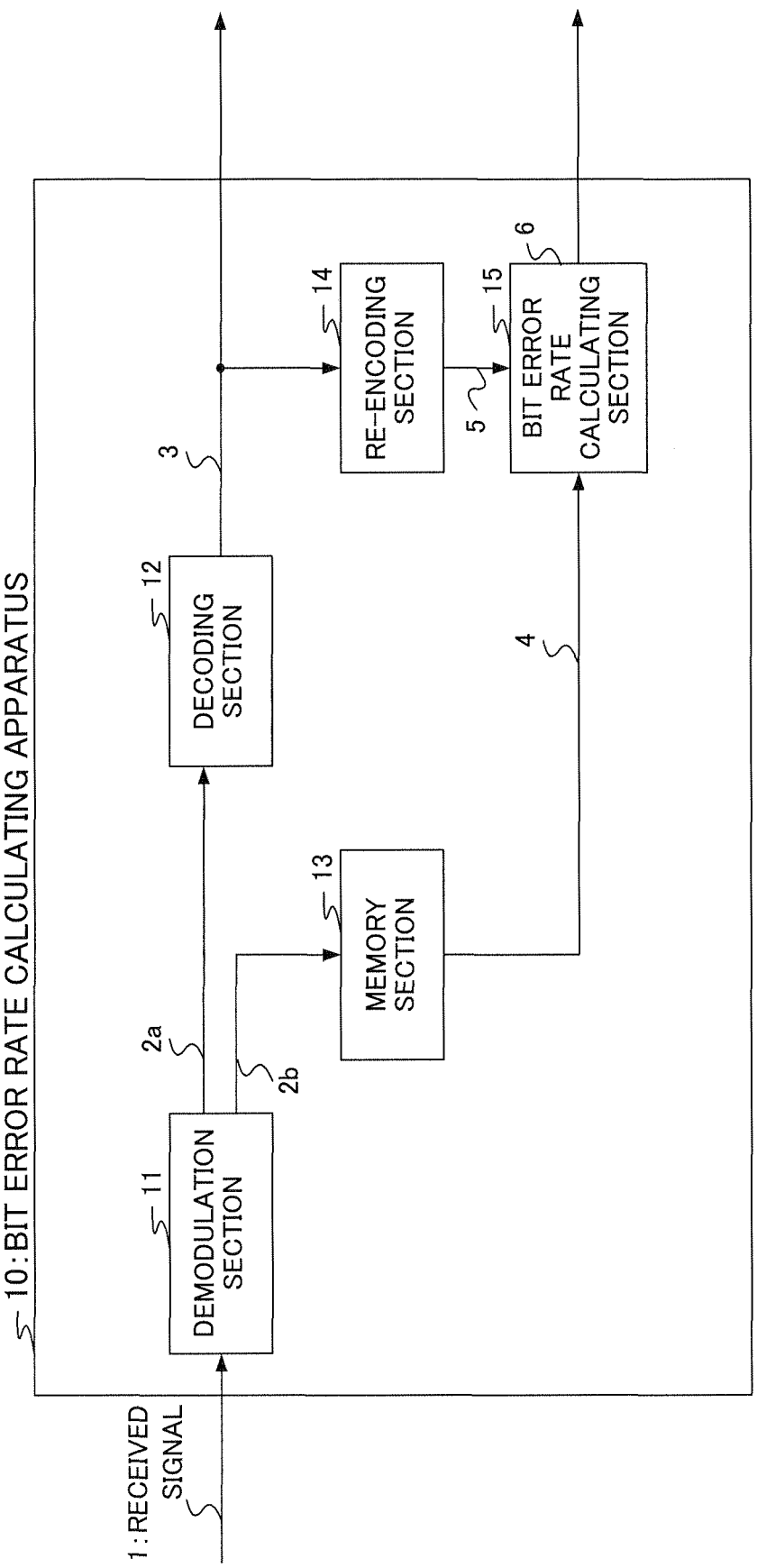
FIG. 11 illustrates a configuration of a conventional bit error rate estimating apparatus.

FIG. 9 is a block diagram showing the configuration of the wireless communication apparatus according to Embodiment 3 of the present invention. In explanations of the present embodiment, components having the same configuration and operation as the components in FIG. 1 are assigned the same reference numerals.

In FIG. 9, wireless communication apparatus 300 is configured by further adding transmission section 310 to wireless communication apparatus 100 in FIG. 1. Furthermore, higher layer processing section 130 employs a configuration having communication scheme change request control section 301 and transmission data generating section 302, and transmission section 310 employs a configuration having encoding section 311 that encodes transmission data from higher layer processing section 130 and modulation section 312 that modulates the encoded data.

Wireless communication apparatus 300 has pseudo post-decoding error estimating section 120 similar to that in FIG. 1, thereby obtaining pseudo residual bit error detected result 157 indicating whether or not errors after decoding occur when transmission is performed in the modulation scheme of 16QAM in a transmission path environment similar to the current one.

In this way, when pseudo residual bit error detected result 157 is an estimated result indicating that no residual bit errors will occur, communication scheme change request control section 301 in higher layer processing section 130 decides to change the communication scheme from the QPSK modulation scheme to 16QAM.

On the contrary, when the estimated result indicates that residual bit errors will occur, communication scheme change request control section 301 decides to continue communication in the current communication scheme.

When communication scheme change request information 158 based on the above-described decision is fed back to the supplier of the radio transmission through transmission data generating section 302 and transmission section 310, it is possible to change the subsequent communication scheme to 16QAM and carry out communication with higher efficiency.

FIG. 10 shows an example of decision content for a communication scheme change based on inputted pseudo residual bit error detected result 157, in above-described communication scheme change request control section 301.

In FIG. 10, when the presence or absence of residual bit errors after decoding with the modulation scheme and coding rate used for current reception is decided as a post decoding bit error detected result, and the presence or absence of residual bit errors after decoding is decided as the pseudo residual bit error detected result when the M-ary number of the modulation scheme or coding rate is increased, the decision content of communication scheme control specifically corresponds to transmission rate change request content.

As shown in FIG. 10, when the residual bit error after decoding with the modulation scheme and the coding rate used for current reception is "present", the above-described transmission rate change request is "decrease." On the other hand, when the residual bit error after decoding with the modulation scheme and the coding rate used for current reception is "not present", the above-described transmission rate change request varies depending on the "presence or absence" of the residual bit error after decoding when the M-ary number of the modulation scheme or coding rate is increased, and the request is "no change" when the residual bit error after decoding is "present", and "increase" when the residual bit error after decoding is "not present".

Here, although a case has been described where the present invention is applied to Embodiment 1 in FIG. 1 as an example, the present invention is applicable to Embodiment 2 in FIG. 7 or FIG. 8.

As described above, according to Embodiment 3, it is possible to change the communication scheme used for data transmission to a more appropriate one based on the pseudo residual bit error estimated result that can be obtained as described in Embodiment 1 or Embodiment 2 and realize higher efficient communication.

The above explanations are illustrations of preferred embodiments of the present invention, and the scope of the present invention is not limited to this.

For example, although a case has been described in the present embodiment where the configuration and operating mode where higher layer processing section 130 of wireless communication apparatus 300 autonomously decides whether or not it is necessary to change a communication scheme to be used using post-decoding bit error detected result 154 and pseudo residual bit error detected result 157 and transmits (feeds back) a change request to the radio station of a communicating party, the present invention is not limited to this.

Furthermore, it is also possible to employ a configuration and operation where post-decoding bit error detected result 154 and pseudo residual bit error detected result 157 obtained at reception section 110 are transmitted to the radio station of the communicating party as parameters indicating quality of a transmission link through transmission section 310, and the radio station of the communicating party decides whether or not it is necessary to change the communication scheme used in the communication link.

In this case, post-decoding bit error detected result 154 and pseudo residual bit error detected result 157 can be expressed as one-bit flag information and may be assigned to a predetermined position in the frame configuration of transmission data and transmitted. Of these results, it is also possible to employ a configuration without using post-decoding bit error detected result 154. Furthermore, wireless communication apparatus 300 may also be configured so as to estimate a plurality of different modulation schemes and coding rates, perform pseudo residual bit error detection in the modulation schemes and coding rates and report the detected result of the plurality of obtained pseudo residual post-decoding errors to the radio station of the communicating party.

Moreover, the present invention can be incorporated, for example, as a radio terminal and can be realized as a mobile communication system having the received signal quality estimating apparatus and the received signal quality estimating method.

Furthermore, although the above-described embodiments have used the terms of "received signal quality estimating apparatus" and "received signal quality estimating method", this is for ease of explanation, and those terms may also be "receiving apparatus", "wireless communication system" and "reception method".

Furthermore, the type, number or connection method of circuit sections configuring the above-described wireless communication apparatus is not limited to the aforementioned embodiments.

The present application is based on Japanese Patent Application No. 2005-156082, filed on May 27, 2005 and Japanese Patent Application No. 2006-140472, filed on May 19, 2006, the entire content of which is expressly incorporated by reference herein.

INDUSTRIAL APPLICABILITY

The received signal quality estimating apparatus and received signal quality estimating method according to the present invention uses signals radio transmitted according to the modulation scheme, coding scheme or a time-space multiplexing scheme used for current reception, estimates in a pseudo manner whether or not residual bit errors after decoding occur when the modulation scheme, coding rate or the degree of time-space multiplexing used for communication in the same situation of wireless communication link as the current one is increased, and can appropriately decide whether or not communication can be performed with an increased M-ary number, coding rate or the multiplicity of time-space multiplexing. Therefore, it is possible to realize the more appropriate and efficient adaptive communication control and improve the transmission efficiency, and is useful as the configuration of the received signal quality estimating section in a wireless communication apparatus in a wireless communication system which adaptively controls a communication scheme. Furthermore, the present invention is not necessarily limited to the wireless communication field and is also applicable to the use of a wired communication field carrying out communication through wired transmission paths if modulation and error correction coding are used.

The invention claimed is:

1. A received signal quality estimating apparatus comprising:
    a receiving section that receives a signal transmitted according to a first communication scheme;
    a generating section that generates a value of quality characteristics corresponding to a demodulated result obtained when a signal is transmitted according to a second communication scheme which is different from the first communication scheme based on a received and demodulated result according to the first communication scheme used for reception; and
    an estimating section that estimates in a pseudo manner whether or not residual bit errors occur after reception, demodulation and error correction decoding according to the second communication scheme, from the value of quality characteristics.

2. The received signal quality estimating apparatus according to claim 1, wherein:
    the receiving section comprises a demodulating section that demodulates the received signal according to a predetermined modulation scheme and obtains an orthogonal vector data sequence for each received symbol; and
    the generating section comprises a likelihood value generating section that generates in a pseudo manner a likelihood value obtained when radio transmission is carried out according to the second communication scheme different from the first communication scheme using the orthogonal vector data sequence.

3. The received signal quality estimating apparatus according to claim 1, wherein:
    the generating section generates in a pseudo manner a likelihood value obtained when communication is carried out according to the second communication scheme using a received and demodulated result according to the first communication scheme; and
    the estimating section performs error correction decoding according to the first communication scheme in a pseudo manner using the generated pseudo likelihood value, and estimates in a pseudo manner whether or not residual bit errors occur based on a pseudo error correction decoded result.

4. The received signal quality estimating apparatus according to claim 1, wherein the estimating section estimates an error rate based on the obtained estimated result as to whether or not residual bit errors occur.

5. The received signal quality estimating apparatus according to claim 1, wherein the second communication scheme is used instead of the first communication scheme in a radio transmission path environment similar to the environment where a received signal is radio transmitted according to the first communication scheme.

6. The received signal quality estimating apparatus according to claim 1, wherein the M-ary number of the modulation scheme used in the second communication scheme is larger than the M-ary number of the modulation scheme used in the first communication scheme.

7. The received signal quality estimating apparatus according to claim 1, wherein the coding rate of error correction coding used in the second communication scheme is different from the coding rate of error correction coding used in the first communication scheme.

8. The received signal quality estimating apparatus according to claim 1, wherein multiplexed transmission using time-space multiplexing is carried out in the first communication scheme and the second communication scheme, and a multiplicity of time-space multiplexing in the second communication scheme is greater than a multiplicity of time-space multiplexing in the first communication scheme.

9. The received signal quality estimating apparatus according to claim 1, further comprising a communication scheme change deciding section that determines a communication scheme used for a transmission link based on the pseudo estimated result of residual bit errors after error correction decoding in the second communication scheme estimated by the estimating section.

10. The received signal quality estimating apparatus according to claim 1, further comprising a reporting section that reports the pseudo estimated result of residual bit errors after error correction decoding in the second communication scheme estimated by the estimating section to a radio station of a communicating party as transmission link quality information.

11. A wireless communication system comprising the received signal quality estimating apparatus according to claim 1.

12. A received signal quality estimating method comprising:
    a reception step of receiving a signal transmitted according to a first communication scheme;
    a generation step of generating a value of quality characteristics corresponding to a demodulated result obtained when a signal is transmitted according to the second communication scheme different from the first communication scheme based on a received and demodulated result according to the first communication scheme used for reception; and
    an estimation step of estimating in a pseudo manner whether or not residual bit errors occur after reception, demodulation and error correction decoding according to the second communication scheme, from the value of quality characteristics.

* * * * *